US006631430B1

(12) United States Patent
Wolrich et al.

(10) Patent No.: US 6,631,430 B1
(45) Date of Patent: Oct. 7, 2003

(54) OPTIMIZATIONS TO RECEIVE PACKET STATUS FROM FIFO BUS

(75) Inventors: Gilbert Wolrich, Fermingham, MA (US); Debra Bernstein, Sudbury, MA (US); Matthew J. Adiletta, Worc, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/473,113

(22) Filed: Dec. 28, 1999

(51) Int. Cl.[7] .......................... G06F 12/00; G06F 13/00
(52) U.S. Cl. ......................... 710/100; 710/52; 711/100
(58) Field of Search ........................... 710/107, 100, 710/22, 52; 711/100, 112, 213; 370/912; 340/286.01; 365/189.01

(56) References Cited

U.S. PATENT DOCUMENTS

| 5,392,391 A | * | 2/1995 | Caulk, Jr. et al. |
| 5,392,412 A | * | 2/1995 | McKenna |
| 5,459,842 A | * | 10/1995 | Begun et al. |
| 6,345,334 B1 | * | 2/2002 | Nakagawa et al. |
| 6,415,338 B1 | * | 7/2002 | Habot |

* cited by examiner

Primary Examiner—Gopal C. Ray
(74) Attorney, Agent, or Firm—Fish & Richardson P.C.

(57) ABSTRACT

Receiving bytes of data from a media device includes issuing N consecutive requests, each for M-bytes, to the media device and receiving N−1 responses of M bytes of data from the media device.

30 Claims, 7 Drawing Sheets

OPTIMIZATIONS TO RECEIVE PACKET STATUS FROM FIFO BUS

BACKGROUND OF THE INVENTION

A network device receives packets of information from a communication media access control device, e.g., an Ethernet controller. Each packet may contain data and the destination address of that data. Each receiving port of the device has a "ready signal" which indicates that a predetermined number of bytes or the last byte of the packet has been received. The predetermined number of bytes is usually 64 because that is the size of a minimum Ethernet packet. A high percentage of Ethernet packets (approximately 80%) are minimum length packets, e.g., 64 bytes. Optimizing for 64 byte packets by requesting 64 bytes increases the bandwidth of the processor.

SUMMARY OF THE INVENTION

According to one aspect of the invention, a method is described of receiving bytes of data from a media device includes issuing N consecutive requests, each for M bytes, to the media device and receiving N-1 responses of M bytes of data from the media device.

Other advantages will become apparent from the following description and from the claims.

DESCRIPTION OF THE PREFERRED EMBODIMENTS

Figure 1:
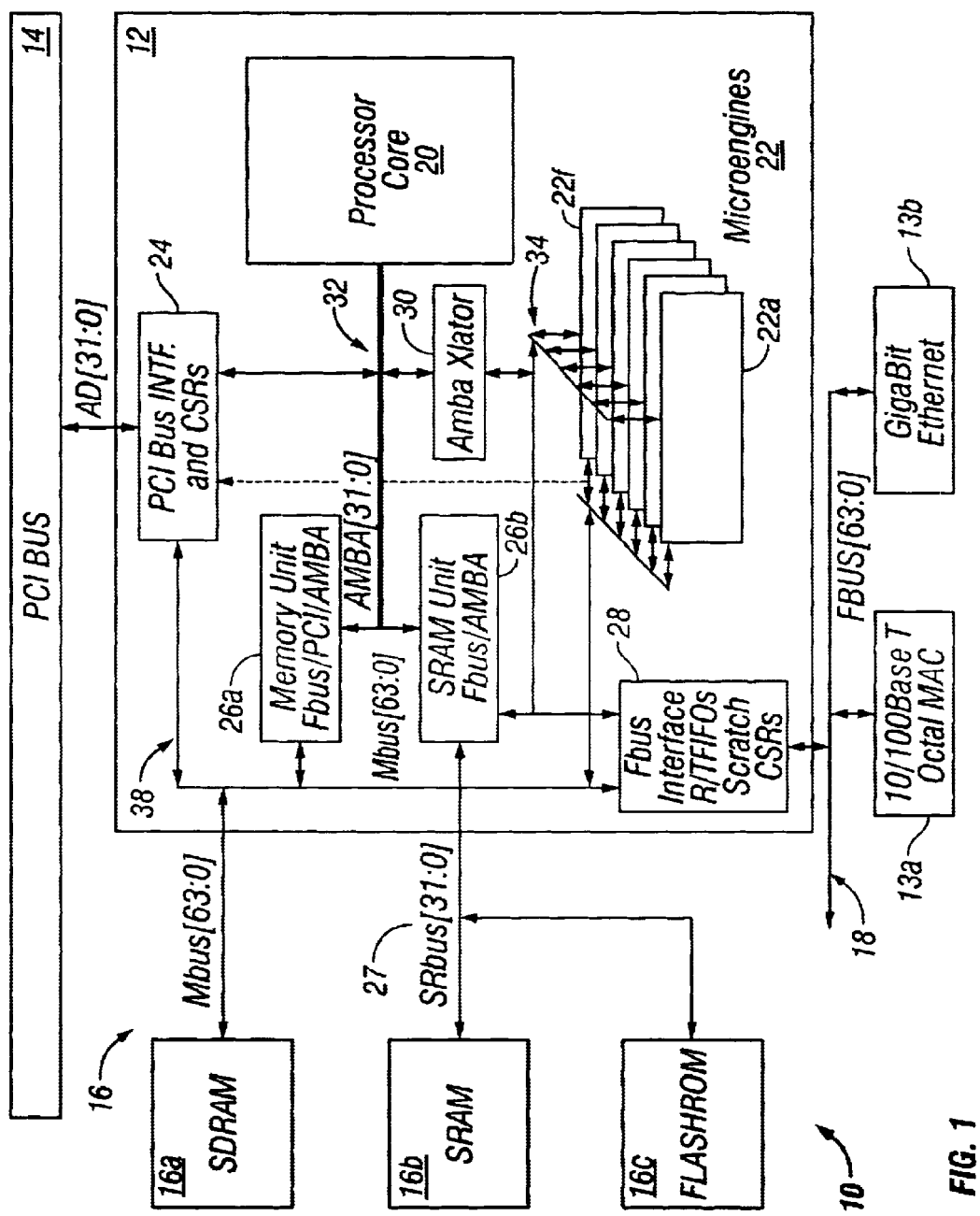
FIG. 1 is a block diagram of a communication system employing a hardware-based multithreaded processor.

Referring to FIG. 1, a communication system 10 includes a parallel, hardware-based multithreaded processor 12. The hardware-based multithreaded processor 12 is coupled to a bus such as a PCI bus 14, a memory system 16, and a second bus 18. The processor 12 includes a bus interface 28 that couples the processor 12 to the second bus 18. Bus interface 28 in one embodiment couples the processor 12 to the so-called FBUS 18 (FIFO (first-in, first-out) bus). The FBUS interface (FBI) 28 is responsible for controlling and interfacing the processor 12 to the FBUS 18. The FBUS 18 is a 64-bit wide FIFO bus, used to interface to MAC devices 13. The system 10 is especially useful for tasks that can be broken into parallel subtasks or functions. Specifically, a hardware-based multithreaded processor 12 is useful for tasks that are bandwidth oriented rather than latency oriented. The hardware-based multithreaded processor 12 has multiple microengines 22 each with multiple hardware controlled threads that can be simultaneously active and independently work on a task.

The hardware-based multithreaded processor 12 also includes a central controller (also called processor or microprocessor) 20 that assists in loading microcode control for other resources of the hardware-based multithreaded processor 12 and performs other general purpose computer type functions such as handling protocols, exceptions, and extra support for packet processing where the microengines 22 pass the packets off for more detailed processing such as in boundary conditions. In one embodiment, the processor 20 is a Strong Arm® (Arm is a trademark of ARM Limited, United Kingdom) based architecture. The general purpose microprocessor 20 has an operating system. Through the operating system, the processor 20 can call functions to operate on microengines 22a–22f. The processor 20 can use any supported operating system, preferably a real time operating system. For the core processor 20 implemented as a Strong Arm architecture, operating systems such as, MicrosoftNT real-time, VXWorks and µCUS, a freeware operating system available over the Internet, can be used.

The hardware-based multithreaded processor 12 also includes a plurality of function microengines 22a–22f. Functional microengines (microengines) 22a–22f each maintain a plurality of program counters in hardware and states associated with the program counters. Effectively, a corresponding plurality of sets of threads can be simultaneously active on each of the microengines 22a–22f while only one is actually operating at any one time.

In one embodiment, there are six microengines 22a–22f as shown. Each microengines 22a–22f has capabilities for processing four hardware threads. The six microengines 22a–22f operate with shared resources including memory system 16 and bus interfaces 24 and 28. The memory system 16 includes a Synchronous Dynamic Random Access Memory (SDRAM) controller 26a and a Static Random Access Memory (SRAM) controller 26b.

SDRAM 16b and SDRAM controller 26a are typically used for processing large volumes of data, e.g., processing of network payloads from network packets. SPAM 16b and SEAM controller 26b are used in a networking implementation for low latency, fast access tasks, e.g., accessing look-up tables, memory for the core processor 20, and so forth.

The six microengines 22a–22f access either the SDRAM 16a or SRAM 16b based on characteristics of the data. Thus, low latency, low bandwidth data is stored in and fetched from SRAM 16b, whereas higher bandwidth data for which latency is not as important, is stored in and fetched from SDRAM 16a. The microengines 22a–22f can execute memory reference instructions to either the SDRAM controller 26a or the SRAM controller 26b.

Advantages of hardware multithreading can be explained by SRAM or SDRAM memory accesses. As an example, an SRAM access requested by a Thread_0, from a microengine 22a–22f will cause the SRAM controller 26b to initiate an access to the SRAM 16b. The SRAM controller 26b controls arbitration for the SRAM bus 27, accesses the SRAM 16b, fetches the data from the SRAM 16b, and returns data to the requesting microengine 22a–22f. During an SRAM 16b access, if the microengine, e.g., 22a, had only a single thread that could operate, that microengine would be dormant until data was returned from the SRAM 16b. The hardware context swapping within each of the microengines 22a–22f enables other contexts with unique program counters to execute in that same microengine. Thus, another thread, e.g., Thread_1, can function while the first thread, e.g., Thread_0, is awaiting the read data to return. During execution, Thread_1 may access the SDRAM memory 16a. While Thread_1 operates on the SDRAM unit 26a, and Thread_0 is operating on the SRAM unit 26b, a new thread, e.g., Thread_2, can now operate in the microengine 22a. Thread_2 can operate for a certain amount of time until it needs to access memory or perform some other long latency operation, such as making an access to a bus interface.

Therefore, simultaneously, the processor 12 can have a bus operation, SRAM operation, and SDRAM operation all being completed or operated upon by one microengine 22a and have one more thread available to process more work in the data path.

The hardware context swapping also synchronizes completion of tasks. For example, two threads could hit the same shared resource, e.g., SRAM 16b. Each one of these separate functional units, e.g., the FBI 28, the SRAM controller 26b, and the SDRAM controller 26a, when they complete a requested task from one of the microengine thread contexts reports back a flag signaling completion of an operation. When the flag is received by the microengine 22a–22f, the microengine 22a–22f can determine which thread to turn on.

Each of the functional units, e.g., the FBI 28, the SRAM controller 26b, and the SDRAM controller 26a, are coupled to one or more internal buses. The internal buses are dual, 32-bit buses (i.e., one bus for read and one for write). The hardware-based multithreaded processor 12 also is constructed such that the sum of the bandwidths of the internal buses in the processor 12 exceeds the bandwidth of external buses coupled to the processor 12. The processor 12 includes an internal core processor bus 32, e.g., an ASB bus (Advanced System Bus), that couples the processor core 20 to the memory controllers 26a, 26b and to an ASB translator 30. The ASB bus 32 is a subset of the so-called AMBA bus that is used with the Strong Arm processor core. The processor 12 also includes a private bus 34 that couples the microengine units 22 to SRAM controller 26b, ASB translator 30, and FBI 28. A memory bus 38 couples the memory controllers 26a, 26b to the bus interfaces 24 and 28 and memory system 16 including a flashrom 16c used for boot operations and so forth.

One example of an application for the hardware-based multithreaded processor 12 is as a network processor. As a network processor, the hardware-based multithreaded processor 12 interfaces to network devices such as a media access controller (MAC) device, e.g., a 10/100BaseT Octal MAC 13a or a Gigabit Ethernet device 13b. In general, as a network processor, the hardware-based multithreaded processor 12 can interface to any type of communication device or interface that receives/sends large amounts of data. If communication system 10 functions in a networking application, it could receive a plurality of network packets from the devices 13a, 13b and process those packets in a parallel manner. With the hardware-based multithreaded processor 12, each network packet can be independently processed.

Figure 2A:
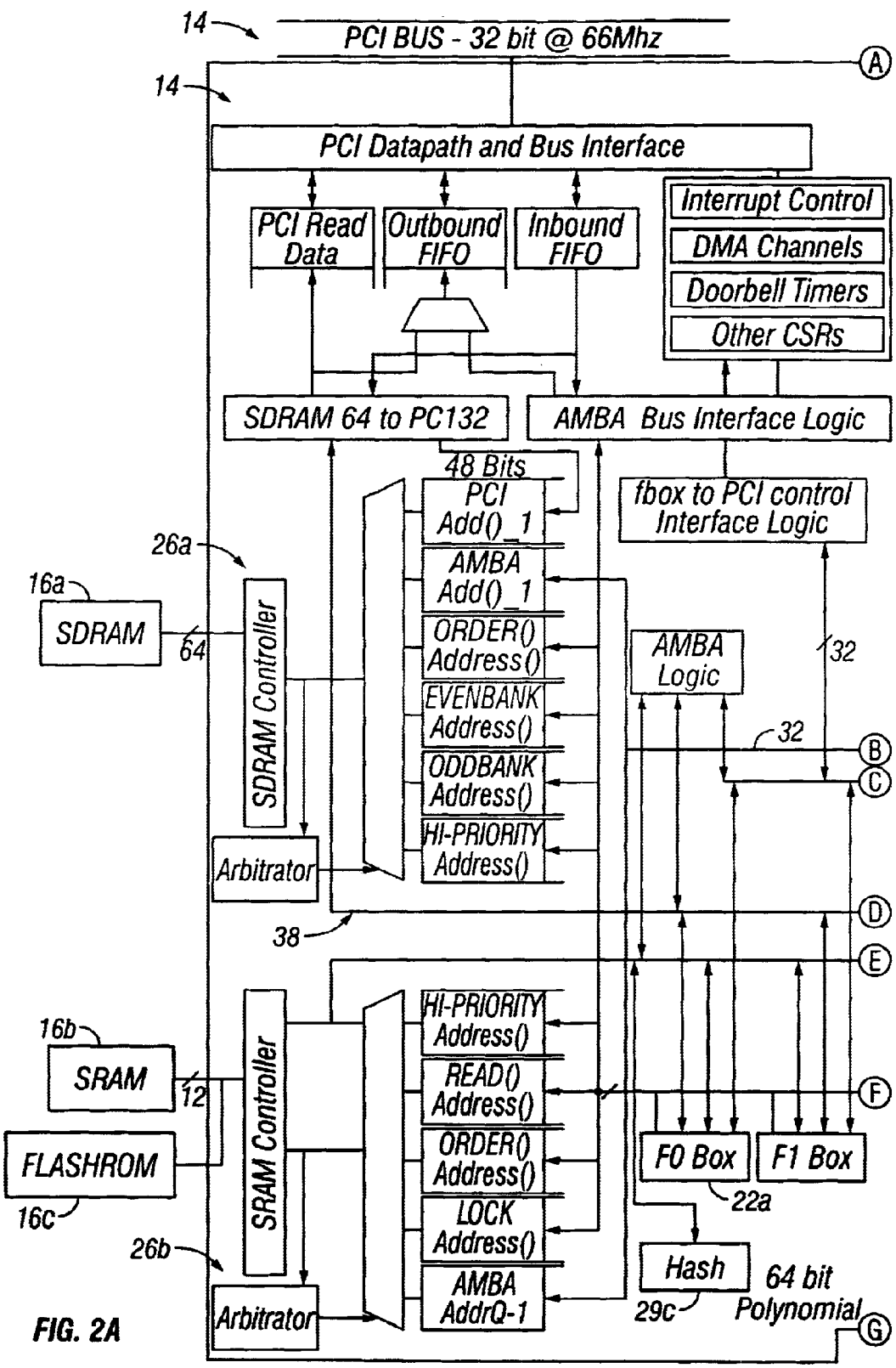
FIG. 2 is a detailed block diagram of the hardware-based multithreaded processor of FIG. 1.
Figure 2B:
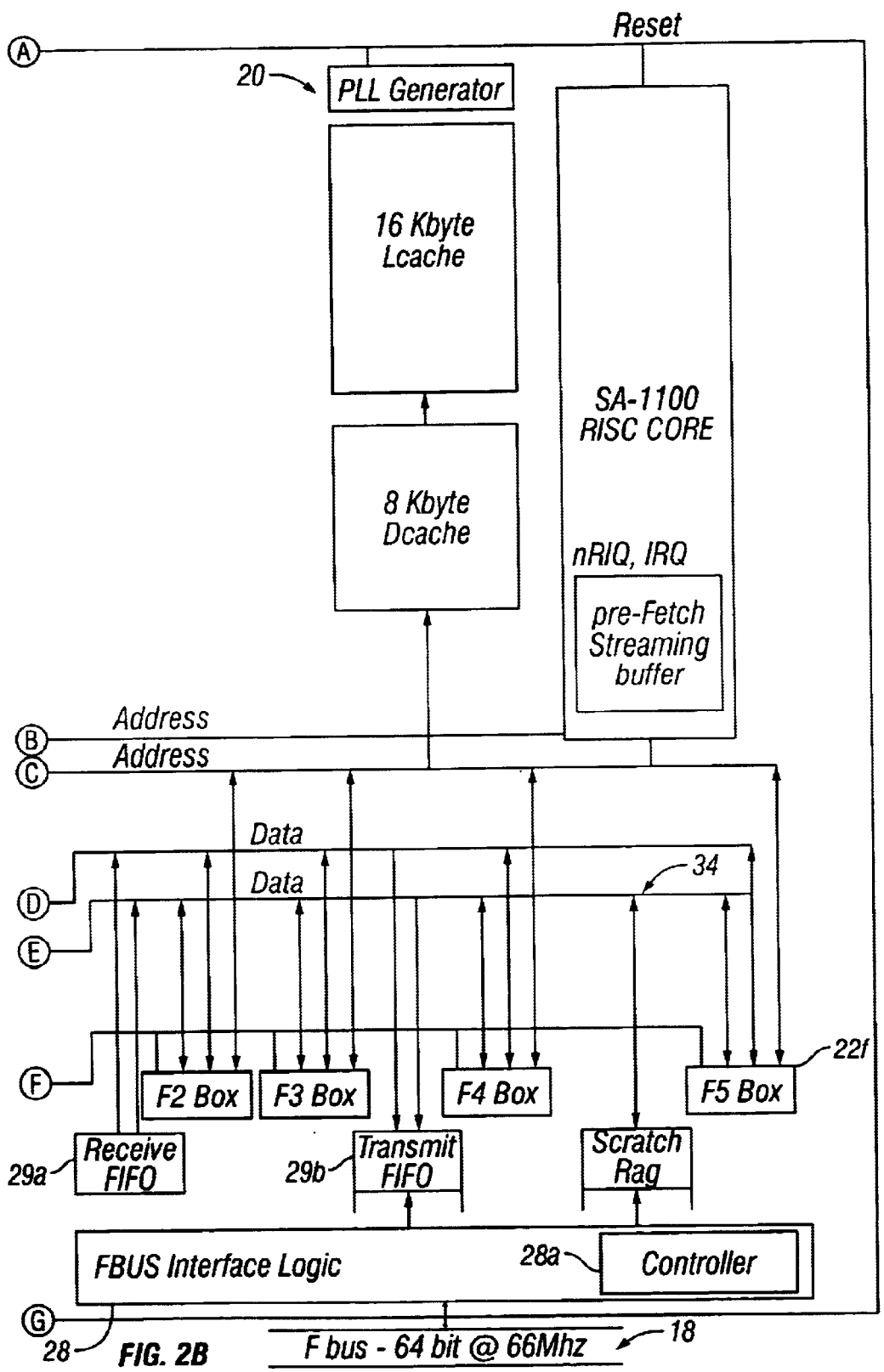

Referring to FIG. 2, the FBI 28 supports Transmit and Receive flags for each port that a MAC device supports, along with an Interrupt flag indicating when service is warranted. The FBI 28 also includes a controller 28a that performs header processing of incoming packets from the FBUS 18. The controller 28a extracts the packet headers and performs a microprogrammable source/destination/protocol hashed lookup (used for address smoothing) in an SRAM unit 26b. If the hash does not successfully resolve, the packet header is sent to the processor core 20 for additional processing. The FBI 28 supports the following internal data transactions:

| FBUS unit | (Shared bus SRAM) | to/from microengine |
| FBUS unit | (via private bus) | writes from SDRAM Unit |
| FBUS unit | (via Mbus) | Reads to SDRAM |

The FBUS 18 is a standard industry bus and includes a data bus, e.g., 64 bits wide, and sideband control for address and read/write control. The FBI 28 provides the ability to input large amounts of data using a series of input and output FIFOs 29a–29b. From the FIFOs 29a–29b, the microengines 22a–22f fetch data from or command a SDRAM controller 26a to move data from a receive FIFO in which data has come from a device on bus 18 into the FBI 28. The data can be sent through SDRAM controller 26a to SDRAM memory 16a, via a direct memory access. Similarly, the microengines 22a–22f can move data from the SDRAM 26a to the FBI 28 and out to the FBUS 18 via the FBI 28.

Figure 3A:
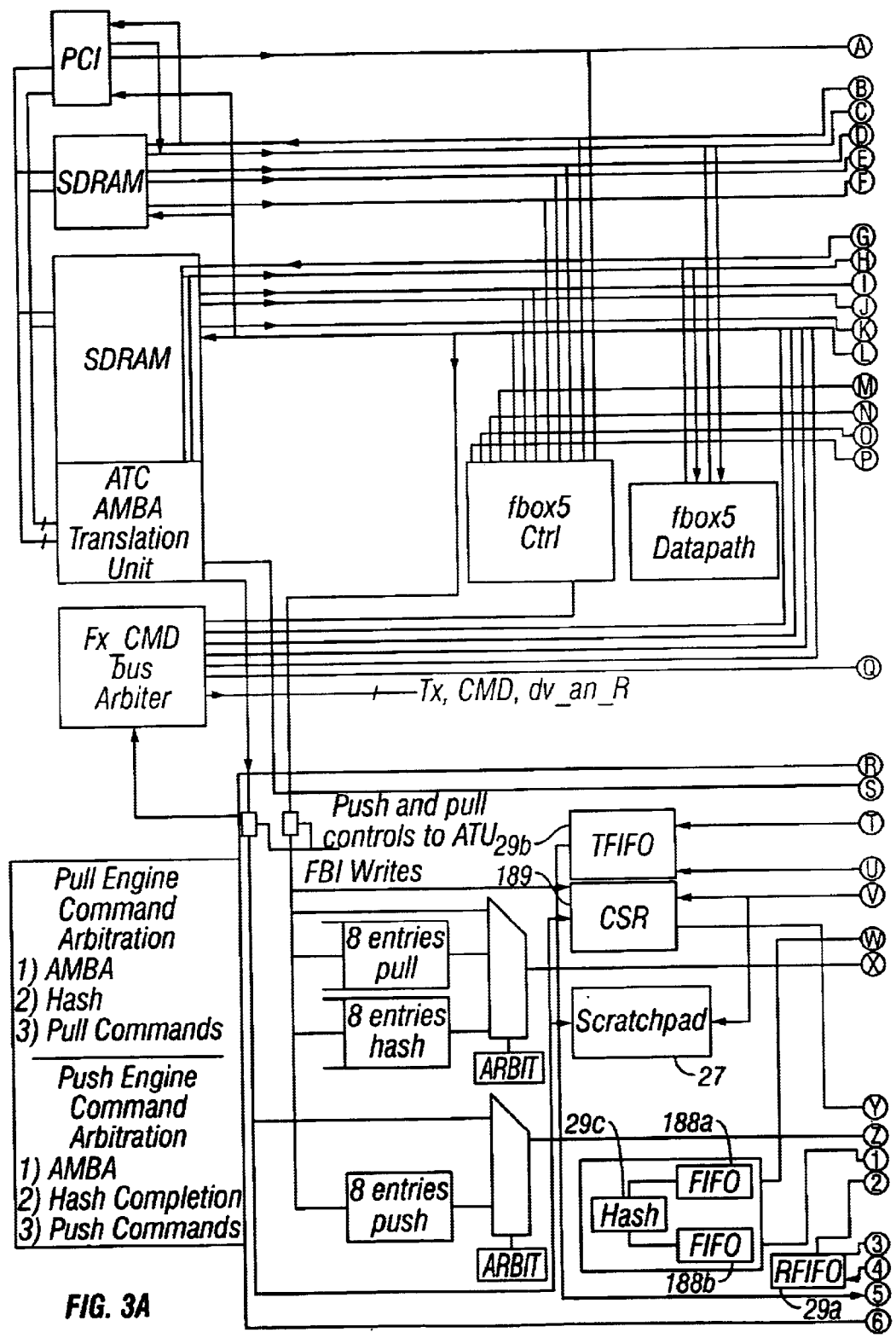
FIG. 3 is a block diagram of a communication bus interface in the processor of FIG. 1.
Figure 3B:
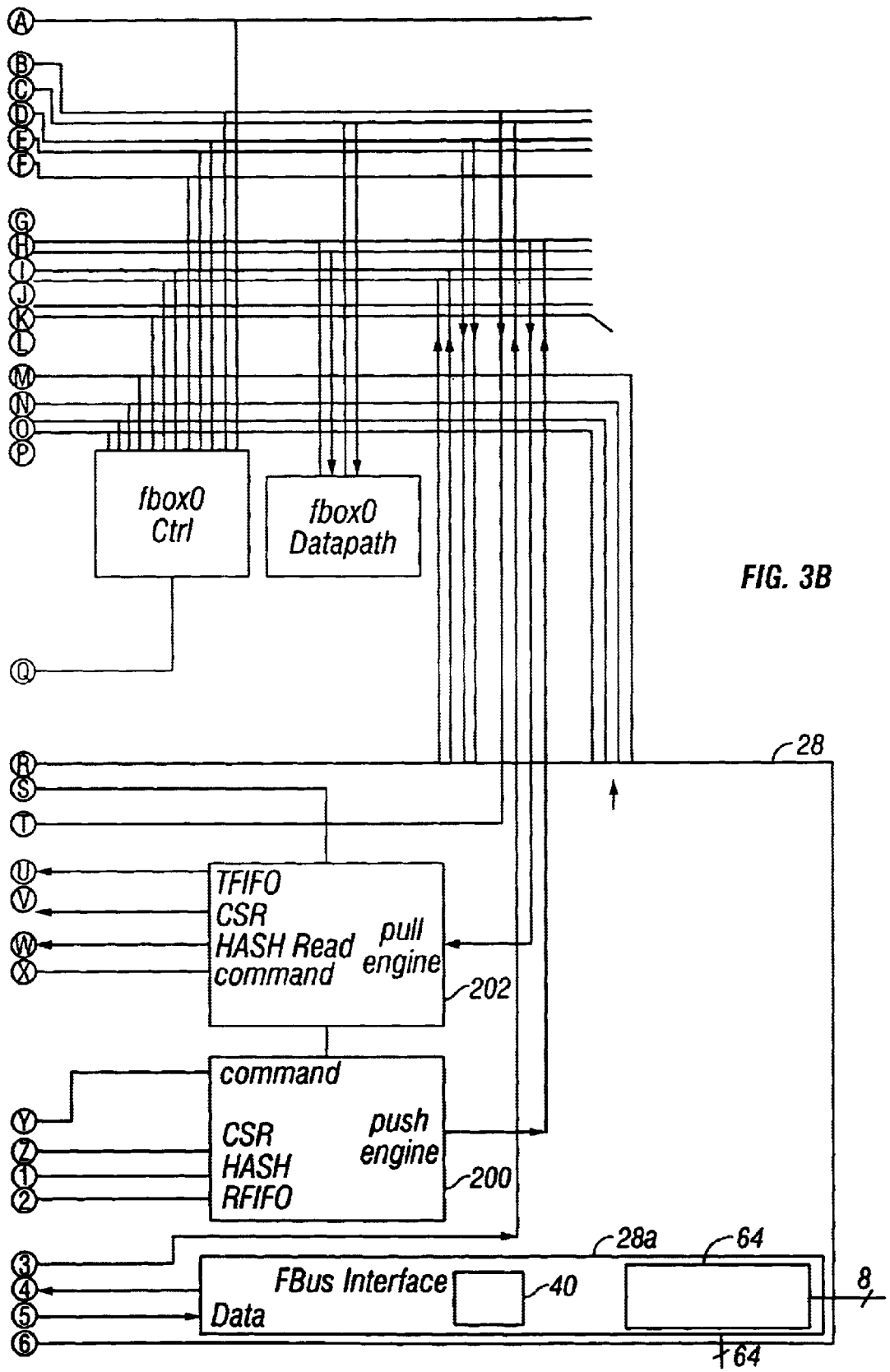

Referring to FIG. 3, communication between the microengines 22a–22f and the FBI 28 is shown. The FBI 28 in a network application can perform header processing of incoming packets from the FBUS 18. A key function that the FBI 28 performs is extraction of packet headers, and a microprogrammable source/destination/protocol hashed lookup in SRAM 26b. If the hash does not successfully resolve, the packet header is promoted to the core processor 20 for more sophisticated processing.

The FBI 28 contains a transmit FIFO 29b, a receive FIFO 29a, a hash unit 29c, and FBI control and status registers (CSR) 189. These four units communicate with the microengines 22a–22f via a time-multiplexed access to the SRAM bus 38 that is connected to transfer registers in the microengines 22a–22f. All data transfers to and from the microengines 22a–22f are via the transfer registers. The FBI 28 includes a push state machine 200 for pushing data into the transfer registers during the time cycles which the SRAM 26b is not using the SRAM data bus (part of bus 38) and a pull state machine 202 for fetching data from the transfer registers in the respective microengine 22a–22f.

The hash unit 29c includes a pair of FIFOs 188a and 188b. The hash unit 29c determines that the FBI 28 received an FBI_hash request from a microengine 22a–22f. The hash unit 29c fetches hash keys from the requesting microengine 22a–22f. After the keys are fetched and hashed, the indices are delivered back to the requesting microengine 22a–22f. Up to three hashes are performed under a single FBI_hash request. The buses 34 and 38 are each unidirectional: SDRAM_push/pull_data, and Sbus_push/pull_data. Each of these buses requires control signals which will provide read/write controls to the appropriate microengine 22a–22f transfer registers.

Figure 4A:
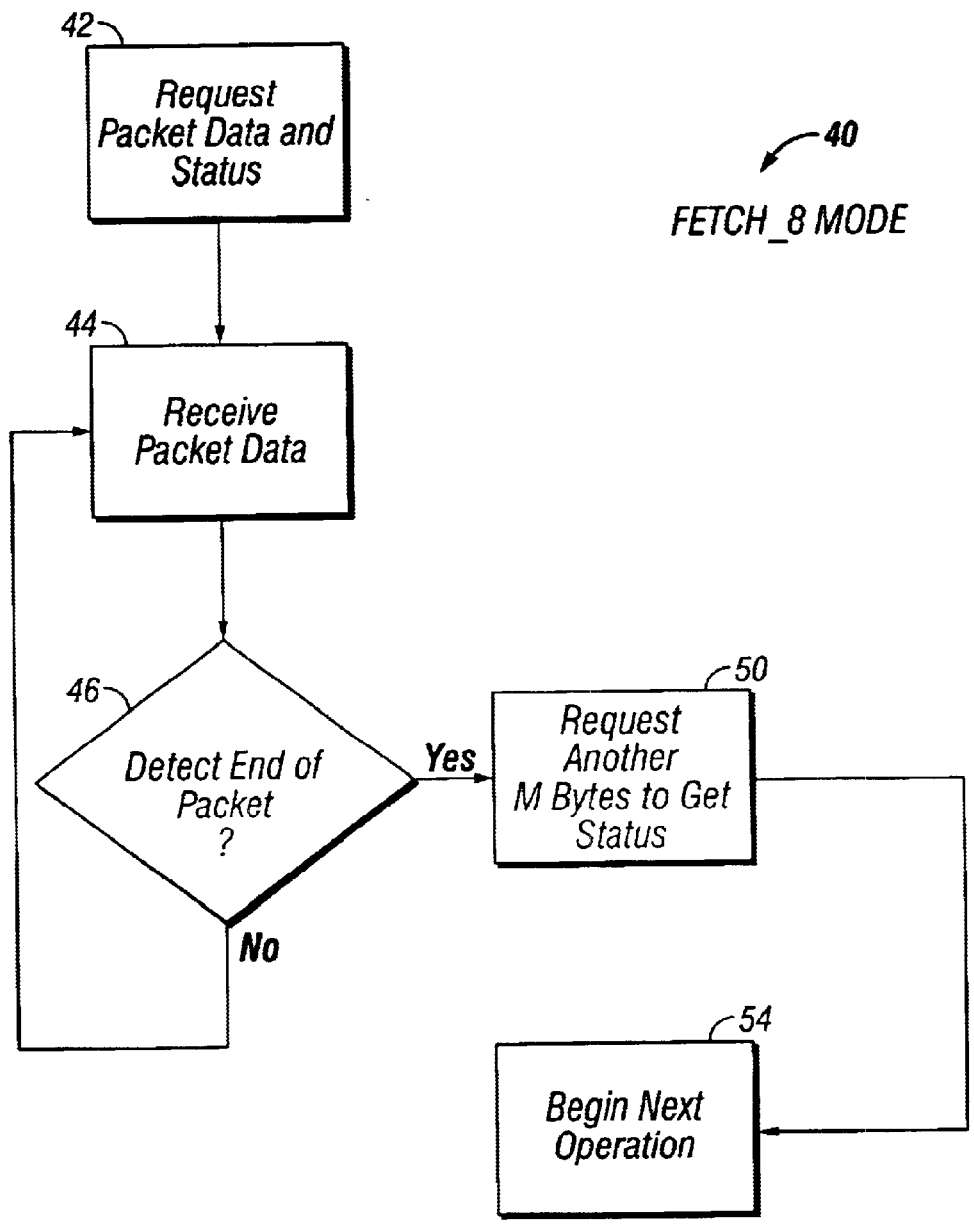
FIGS. 4A and 4B are flowcharts illustrating the operation of a bus interface.
Figure 4B:
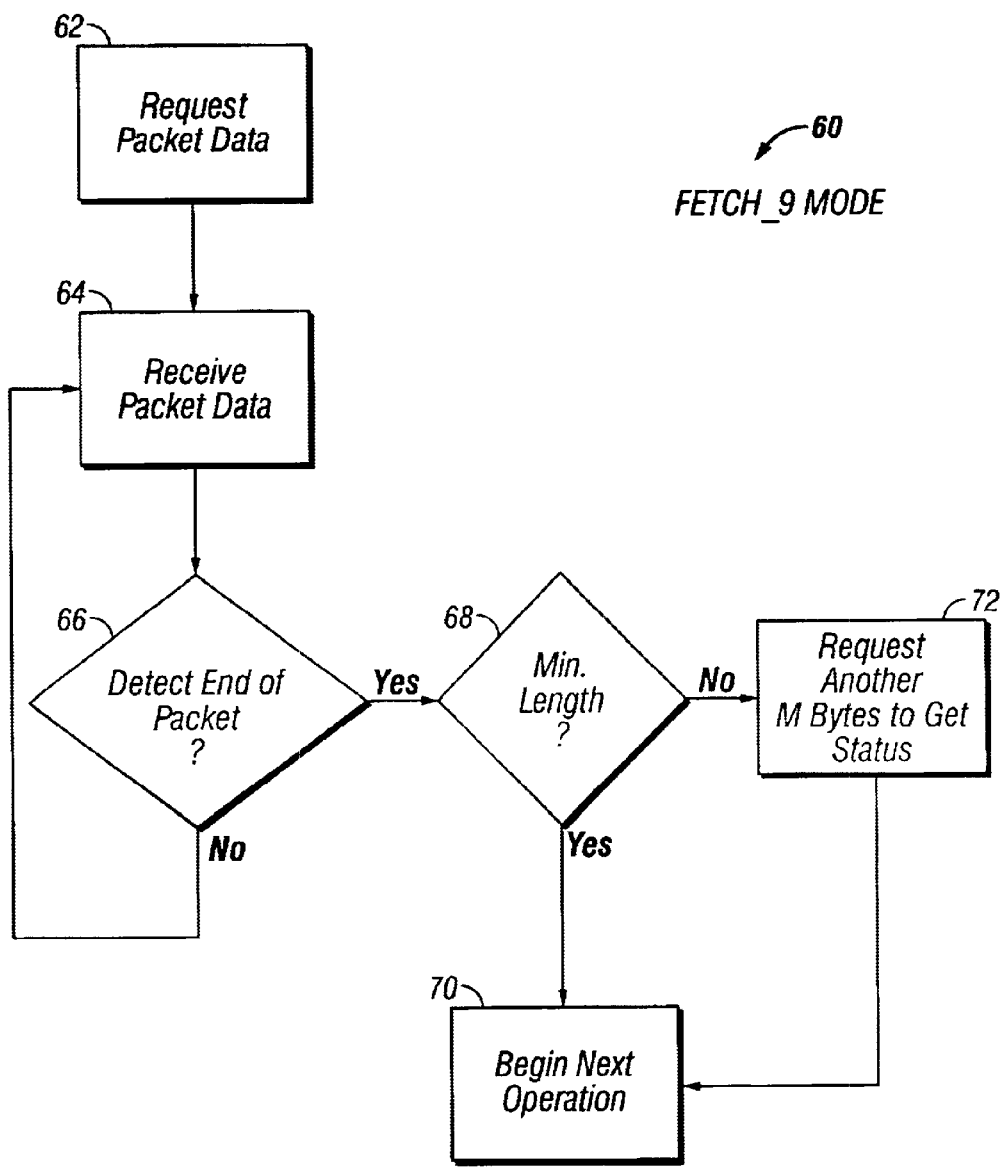

Referring to FIGS. 4A and 4B, the FBI 28 may operate 40 in Fetch_N mode, e.g., Fetch_8 mode, as shown in FIG. 4A, where the value of N may be programmable. In Fetch_8 mode, the FBI 28 requests 42 packet data and status from a MAC device 13, e.g., the 10/100BaseT Octal MAC 13a or the Gigabit Ethernet device 13b over a 64-bit bus, e.g., FBUS 18. In Fetch_N mode, the FBI 28 issues 42 N requests, each for M bytes, e.g., eight bytes (64 bits, one quadword), over N clock cycles (one request per cycle). The MAC device 13 responds to each request, and the FBI 28 receives 44 the M requested bytes in the receive FIFO 29a four cycles after requesting 42 the data and waits to detect 46 an end of packet indicator. In Fetch_8 mode, after receiving 44 all the requested bytes, e.g., 64 and getting the end of packet indicator, the FBI 28 requests 50 and receives another M bytes to obtain the status for minimum length packets, which uses additional clock cycles. The FBI 28 can process 54 a next operation.

Referring to FIG. 4B, the FBI 28 may operate 60 in Fetch_9 mode. In Fetch_9 mode, the FBI 28 requests 62 and receives 64 bytes generally as described above. After eleven cycles, the FBI 28 has received 64 all requested bytes. The receive FIFO 29a contains sixteen elements, each capable of storing 64 bytes of packet data plus sixteen additional bytes (two quadwords) for associated packet status. The first 64 bytes of received packet data are stored in one element of the receive FIFO 29a and the last eight bytes are stored in the first status quadword part of the receive FIFO 29a for that element. In this way, for a minimum sized packet (64 bytes), the FBI 28 already has the status associated with the packet from the initial packet data requests 62 and does not have to wait four additional cycles to request 62 and receive 64 the status.

The FBI 28 checks 66 the requested bytes by looking for an end-of-packet indicator at the end of the first 64 bytes. If the packet is a minimum length packet 68, the FBI 28 begins 70 its next operation, having received 64 a complete packet of data and its status. If the packet is between 64 and 72 bytes, the FBI 28 requests 72 another eight bytes so as to receive 72 the packet status four cycles later. These eight additional bytes are stored in the second status quadword for that element in the receive FIFO 29a. The FBI 28 begins 70 its next operation having now received a complete packet of data and its status.

Still referring to FIG. 4B, the FBI 28 may operate in Fetch_10 mode. Fetch_10 mode optimizes bandwidth for a high frequency of packets having between 64 and 80 bytes, e.g., packets with VLAN (virtual local area network) tags from the Gigabit Ethernet device 13b. In Fetch_10 mode, the FBI 28 requests 62 and receives 64 bytes as described above in FIG. 4B, except the FBI 28 issues 62 ten requests, each for M bytes, over ten clock cycles (one request per cycle). The first 64 bytes are stored in one element of the receive FIFO 29a, bytes 65–72 in the first status quadword of that element, and bytes 73–80 in the second status quadword of that element. As above, the FBI 28 checks 66, 68 to see if the receive FIFO 29a contains the packet data and its status. If so, the FBI 28 begins 48 its next operation 70. If not, it requests 72 another M bytes. Once received, this quadword may be stored in a third status quadword of that element or in another receive FIFO 29a element. The FBI 28 then begins 70 its next operation having now received a complete packet of data and its status.

What is claimed is:

1. A method of receiving bytes of data from a media access control device comprises:

issuing N consecutive requests, each for M bytes, to the media access control device, where M and N are positive integers; and receiving N−1 responses of M bytes of data from the media access control device, in which the N−1 responses of M bytes contain packet data.

2. A method of receiving bytes of data from a media access control device, the method comprising:

issuing N consecutive requests, each for M bytes, to the media access control device, where M and N are positive integers;

receiving N−1 responses of M bytes of packet data from the media access control device; and receiving a last M bytes in which the last M bytes requested contain packet status.

3. The method of claims 2 in which N equals nine.

4. The method of claim 2 in which N equals ten.

5. The method of claim 2 in which M equals eight.

6. The method of claim 2 in which the N−1 responses of M bytes are stored in a FIFO (first-in-first-out) buffer and the remaining M bytes are stored in an associated FIFO buffer.

7. The method of claim 2 in which the value of N is programmable.

8. The method of claims 2 in which a parallel, hardware-based multithreaded processor performs the issuing and receiving.

9. The method of claim 2 wherein a bus interface performs the issuing and receiving.

10. A method of receiving bytes of data from a media access control device, the method comprising:

issuing N consecutive requests, each for M bytes, to the media access control device, where M and N are positive integers;

receiving N−1 responses of M bytes of packet data from the media access control device;

receiving a last M bytes in which the last M bytes contain packet data; and issuing an additional request for M bytes to the media access control device and receiving the additional M bytes.

11. The method of claim 10 in which the additional M bytes contain packet status.

12. An article comprising a computer-readable medium which stores computer-executable instructions for receiving bytes of data from a media access control device, the instructions causing a computer to:

issue N consecutive requests, each for M bytes, to the media access control device, where M and N are positive integers; and receive N−1 responses of M bytes of data from the media access control device, in which the N−1 responses of M bytes contain packet data.

13. An article comprising a computer-readable medium which stores computer-executable instructions for receiving bytes of data from a media device, the instructions causing a computer to:

issue N consecutive requests, each for M bytes, to the media device, where M and N are positive integers; and receive N−1 responses of M bytes of data from the media device, in which the N−1 responses of M bytes contain packet data, in which the last M bytes requested contain packet status.

14. The article of claim 13 in which N equals nine.

15. The article of claim 13 in which N equals ten.

16. The article of claim 13 in which M equals eight.

17. The article of claim 13 in which the (N−1)M bytes are stored in a FIFO (first-in-first-out) buffer and the remaining M bytes are stored in an associated FIFO buffer.

18. The article of claim 13 in which the value of N is programmable.

19. The article of claim 13 in which the computer comprises a parallel, hardware-based multithreaded processor.

20. An article comprising a computer-readable medium which stores computer-executable instructions for receiving bytes of data from a media access control device, the instructions causing a computer to:

issue N consecutive requests, each for M bytes, to the media access control device, where M and N are positive integers; and receive N−1 responses of M bytes of data from the media access control device;

receive a last M bytes in which the last M bytes of data contain packet data, and the instructions further comprise causing a computer to issue an additional request for M bytes to the media access control device.

21. The article of claim 20 in which the additional M bytes contain packet status.

22. A parallel, hardware-based multithreaded processor comprises:

a bus interface to issue N requests for data from a media access control device and to receive N−1 responses to the request from the media access control device, each response to the request having M bytes of packet data from the media access control device, in which the N−1 responses of M bytes contain packet data, where M and N are positive integers.

23. The processor of claim 22 in which the last M bytes requested contain packet status.

24. The processor of claim 22 in which N equals nine.

25. The processor of claim 22 in which N equals ten.

26. The processor of claim 22 in which M equals eight.

27. The processor of claim 22 in which the N−1 responses of M bytes are stored in a FIFO (first-in-first-out) buffer and the remaining m bytes are stored in an associated FIFO buffer.

28. The processor of claim 22 in which the last M bytes of requested data contain packet data, and the bus interface requests an additional M bytes from the media device.

29. The processor of claim 22 wherein the media access control device is an Ethernet controller.

30. A parallel, hardware-based multithreaded processor comprises:

a bus interface to issue N requests for data from a media access control device and to receive N−1 responses to the request from the media access control device, each response to the request having M bytes of packet data from the media access control device, where M and N are positive integers, in which the bus interface is a first-in/first-out bus interface.

* * * * *